United States Patent [19]

Ottung

[11] Patent Number: 4,535,806
[45] Date of Patent: Aug. 20, 1985

[54] VALVE ASSEMBLY FOR THE SUPPLY OF A PRESSURIZED GASEOUS FLUID TO CLOSED CONTAINERS

[76] Inventor: Kaj Ottung, No. 8 Askebyvej, 2830 Virum, Denmark

[21] Appl. No.: 558,450

[22] Filed: Dec. 6, 1983

[30] Foreign Application Priority Data

Dec. 21, 1982 [DK] Denmark .............................. 5646/82

[51] Int. Cl.³ ............................................ F16K 17/26
[52] U.S. Cl. ..............................: 137/493.6; 137/493.9; 137/315; 222/402.21
[58] Field of Search .......................... 222/396, 402.21; 137/493, 493.6, 493.9, 315; 251/347

[56] References Cited

U.S. PATENT DOCUMENTS

| | | | |
|---|---|---|---|
| 1,994,974 | 3/1935 | Wiedmann | 137/493 |
| 2,191,611 | 2/1940 | Eshbaugh et al. | 137/493 |
| 4,133,346 | 1/1979 | Smith et al. | 137/493.6 |
| 4,343,328 | 10/1982 | Junger | 137/493 |

FOREIGN PATENT DOCUMENTS

| | | | |
|---|---|---|---|
| 524190 | 4/1956 | Canada | 222/402.21 |
| 388901 | 3/1922 | Fed. Rep. of Germany | 137/493 |

Primary Examiner—A. Michael Chambers
Attorney, Agent, or Firm—Bernard, Rothwell & Brown

[57] ABSTRACT

A double-acting valve for the supply of a pressurized gaseous fluid to a closed container includes a resilient sleeve-shaped pressure valve member co-operating with a seat in a part of the valve housing and forming per se a seat for a non-return valve ball. The pressure valve member is releasably secured at the lower end of the tubing which can be connected with a source of compressed air and is displaceable in a part of the valve housing. When separating the tubing from the pressure valve member all movable elements may be detached from the housing so that an efficient cleaning can be effected.

9 Claims, 1 Drawing Figure

U.S. Patent  Aug. 20, 1985  4,535,806
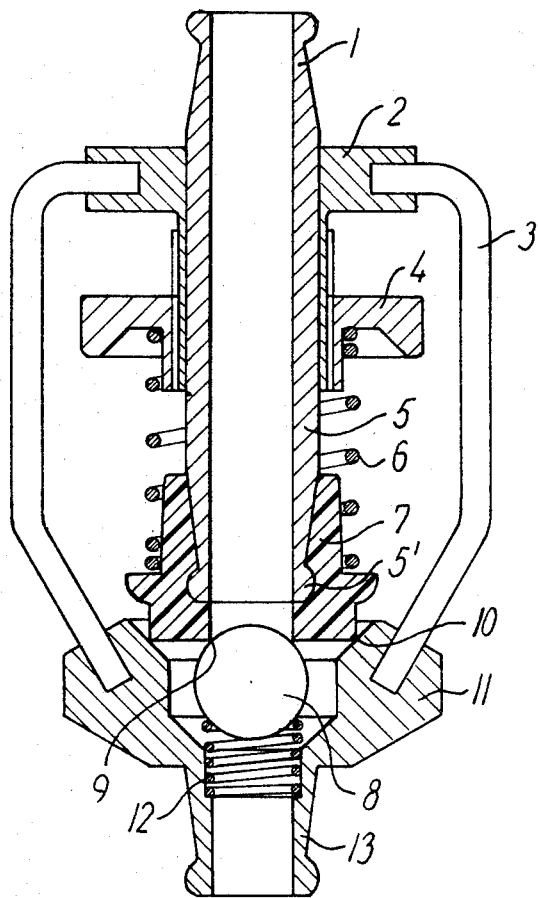

4,535,806

VALVE ASSEMBLY FOR THE SUPPLY OF A PRESSURIZED GASEOUS FLUID TO CLOSED CONTAINERS

FIELD AND BACKGROUND OF THE INVENTION

This invention relates to a valve assembly for the supply of a pressurized gaseous fluid to closed containers and comprising a valve housing with a seat for a spring-biassed resilient pressure valve forming by itself a seat for a non-return valve.

U.S. Pat. No. 4,133,346 discloses a double-acting valve of the similar type adapted to control the pressure in the fuel tank or the cooling water radiator of a motor car.

The valve according to the invention is primarily intended for the supply of a pressurized gaseous fluid to containers with easily contaminating liquids and must therefore, in addition to be economic in production, be easy to separate for the purpose of cleaning in a biologically satisfactory manner.

BRIEF SUMMARY OF THE INVENTION

In this respect the valve according to the invention is characterized in that the pressure valve member is supported by the end of a tubing opposite the associate valve seat, said tubing being displaceable in the housing and adapted to be connected with a source of compressed gaseous fluid, and the pressure valve member being releasably secured to said tubing by a bulb connection.

Without using tools the tubing may in that case be pulled out of the pressure valve member, thereby causing all movable parts of the valve to be released from the valve housing so that said valve housing as well as the movable parts may be efficiently cleaned, following which the valve may be reassembled in a simple manner and likewise without the use of tools.

BRIEF DESCRIPTION OF THE DRAWING

The drawing illustrates a preferred embodiment of the valve according to the invention shown in axial section.

DETAILED DESCRIPTION OF THE PREFERRED EMBODIMENT

The illustrated valve comprises a housing consisting of a top part 2 and a lower part 11 and two or more stirrups 3 interconnecting them. The lower part 11 of the housing is provided with a hose stud 13 adapted to be connected with a container, not shown, to which air or gas shall be supplied at moderate pressure above atmospheric. This supply is effected through a hose, not shown, that is mounted on a stud 1 at the top end of a tubing 5 which is displaceable in the top part 2 of the housing and at its lower end is provided with a resilient pressure valve member 7 which by a spring 6 is biassed towards an associate seat 10 on the lower part 11 of the housing. The spring pressure is adjustable, the upper end of the spring 6 resting against an adjusting disc 4 that is in threaded engagement with the tubing 5.

The pressure valve member 7 is designed as a bushing or sleeve held on the tubing 5 by means of a bulb 5' thereon and forming itself a seat 9 for a non-return valve ball 8 urged in the closing direction by a spring 12 supporting on the valve housing member 11.

A manual pull is sufficient to release the tubing 5 from the pressure valve member 7, following which said pressure valve member and the remaining movable elements may be removed from the housing so that all components of the valve may be efficiently cleaned.

I claim:

1. A pressure valve assembly for the supply of a pressurized gaseous fluid to a closed container, comprising:
   a valve housing with a valve seat therein;
   a tubular member guided for axial displacement towards and away from said valve seat and forming a fluid supply channel;
   a resilient hollow pressure valve member releasably secured to said tubular member by a bulb connection at one end of the tubular member, the resilient valve member forming itself a seat for a non-return check valve; and
   a spring urging said tubular member with the resilient pressure valve member thereon towards the valve seat in said housing.

2. A pressure valve assembly for the supply of a pressurized gaseous fluid to a closed container, comprising:
   a valve housing having a first valve seat therein and a fluid passageway therethrough, the valve housing being adapted for connection with a container to place said fluid passageway in communication with the container;
   a tubular member forming a fluid supply channel, the tubular member having two ends, one end of which is adapted for connection with a fluid supply;
   means for axially guiding the tubular member towards and away from the first valve seat;
   a non-return check valve member within the fluid passageway;
   a resilient hollow pressure valve member adapted for cooperation with the first valve seat to control fluid passage out of the container through the fluid passageway, the resilient valve member being releasably secured to said tubular member by a bulb connection at a second end of said two ends of said tubular member, the resilient valve member forming itself a second valve seat for said non-return check valve member, said second valve seat being adapted for cooperation with said non-return check valve member to control fluid passage into the container from said fluid supply, through said fluid supply channel and said fluid passageway; and
   a spring cooperating with the tubular member and the resilient valve member to urge said tubular member with the resilient valve member connected thereto towards the first valve seat in said housing.

3. The valve assembly of claim 2 further including means for adjusting pressure of said spring to urge the tubular member and resilient valve member towards the first valve seat.

4. The valve assembly of claim 2 further including a second spring within the fluid passageway and supported by the valve housing, the second spring cooperating with the valve housing and the non-return check valve member to urge the non-return check valve member towards the second valve seat.

5. The valve assembly of claim 4 wherein the non-return check valve member is a ball.

6. The valve assembly of claim 2 wherein the non-return check valve member is a ball.

7. The valve assembly of claim 2 wherein the means for axially guiding the tubular member towards and away from the first valve seat comprises a portion of the valve housing.

8. The valve assembly of claim 3, wherein the pressure-adjusting means is located between the tubular member-guiding means and the first valve seat.

9. A pressure valve assembly for the supply of a pressurized gaseous fluid to a closed container, comprising:

- a valve housing having a first valve seat therein and a fluid passageway therethrough, the valve housing being adapted for connection with a container to place said fluid passageway in communication with the container;
- a tubular member forming a fluid supply channel, the tubular member having two ends, one end of which is adapted for connection with a fluid supply;
- means for axially guiding the tubular member towards and away from the first valve seat, the tubular member guiding means comprising a portion of the valve housing;
- a non-return check valve ball within the fluid passageway;
- a resilient hollow pressure valve member adapted for cooperation with the first valve seat to control fluid passage out of the container through the fluid passageway, the resilient valve member being releasably secured to said tubular member by a bulb connection at a second end of said two ends of said tubular member, the resilient valve member forming itself a second valve seat for said non-return check valve ball, said second valve seat being adapted for cooperation with said non-return check valve ball to control fluid passage into the container from said fluid supply, through said fluid supply channel and said fluid passageway;
- a first spring cooperating with the tubular member and the resilient valve member to urge said tubular member with the resilient valve member connected thereto towards the first valve seat in said housing;
- means for adjusting pressure of said spring to urge the tubular member and resilient member towards the first valve seat, the pressure-adjusting means being located between the tubular member guiding means and the first valve seat; and
- a second spring within the fluid passageway and supported by the valve housing, the second spring cooperating with the valve housing and the non-return check valve ball to urge the non-return check valve ball towards the second valve seat.

* * * * *